US011214474B2

(12) United States Patent
Krom et al.

(10) Patent No.: US 11,214,474 B2
(45) Date of Patent: Jan. 4, 2022

(54) DOMESTIC BEVERAGE DISPENSING DEVICE HAVING COOLING MEANS AND METHOD OF USING SAME

(75) Inventors: Peter Carel Krom, Eindhoven (NL); Karel Johannes Adrianus Van Den Aker, Eindhoven (NL); Christoph Dobrusskin, Eindhoven (NL); Johannes Wilhelmus Weekamp, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 204 days.

(21) Appl. No.: 13/131,049

(22) PCT Filed: Nov. 30, 2009

(86) PCT No.: PCT/IB2009/055416

§ 371 (c)(1),
(2), (4) Date: May 25, 2011

(87) PCT Pub. No.: WO2010/064191

PCT Pub. Date: Jun. 10, 2010

(65) Prior Publication Data

US 2011/0229619 A1 Sep. 22, 2011

(30) Foreign Application Priority Data

Dec. 2, 2008 (EP) .................................... 08170478

(51) Int. Cl.

| | |
|---|---|
| ***C12G 3/00*** | (2019.01) |
| ***B67D 7/80*** | (2010.01) |
| ***B67D 1/08*** | (2006.01) |
| ***B67D 1/04*** | (2006.01) |

(52) U.S. Cl.
CPC ............ *B67D 1/0857* (2013.01); *B67D 1/04* (2013.01); *B67D 1/0869* (2013.01)

(58) Field of Classification Search
CPC ....... B67D 1/04; B67D 1/0857; B67D 1/0869
USPC .............. 426/524; 222/146.6, 129.1, 43, 46; 13/524
See application file for complete search history.

(56) References Cited

U.S. PATENT DOCUMENTS

| | | | | |
|---|---|---|---|---|
| 2,644,619 A * | 7/1953 | Brown | 222/397 |
| 3,982,724 A * | 9/1976 | Citrin | 251/7 |
| 4,491,247 A * | 1/1985 | Nitchman | B65D 77/06 220/586 |
| 4,802,343 A | 2/1989 | Rudick et al. | |
| 4,804,110 A * | 2/1989 | Sperry et al. | 222/56 |

(Continued)

FOREIGN PATENT DOCUMENTS

| | | |
|---|---|---|
| EP | 1020694 | 7/2000 |
| EP | 1477754 A1 | 11/2004 |

(Continued)

*Primary Examiner* — Anthony J Weier
(74) *Attorney, Agent, or Firm* — Schott, P.C.

(57) ABSTRACT

A domestic beverage dispensing device includes a conduit for supplying the beverage from keg to a tap and a cooling member. The cooling member has a passage surrounded by heat conductive material. A disposable tube of deformable material forms at least a part of the conduit and extends through the passage. The deformability of the material of the disposable tube is such that the outer surface of the wall of the tube abuts against the inner surface of the passage when the beverage is pressurized.

20 Claims, 1 Drawing Sheet

(56) References Cited

U.S. PATENT DOCUMENTS

| | | | | |
|---|---|---|---|---|
| 5,634,343 | A | 6/1997 | Baker, III | |
| 6,264,069 | B1 * | 7/2001 | Hughes | B67D 1/08 138/30 |
| 7,237,390 | B1 | 7/2007 | Nelson | |
| 8,899,445 | B2 | 12/2014 | Rasmussen | |
| 2004/0098991 | A1 * | 5/2004 | Heyes | B67D 1/0869 62/3.64 |
| 2008/0141702 | A1 * | 6/2008 | Gagliano et al. | 62/389 |

FOREIGN PATENT DOCUMENTS

| | | | |
|---|---|---|---|
| JP | 10162238 | A | 6/1998 |
| JP | 2002046799 | A | 2/2002 |
| WO | 0192145 | A1 | 12/2001 |
| WO | 2004051163 | A2 | 6/2004 |
| WO | 2005007559 | A2 | 1/2005 |

* cited by examiner

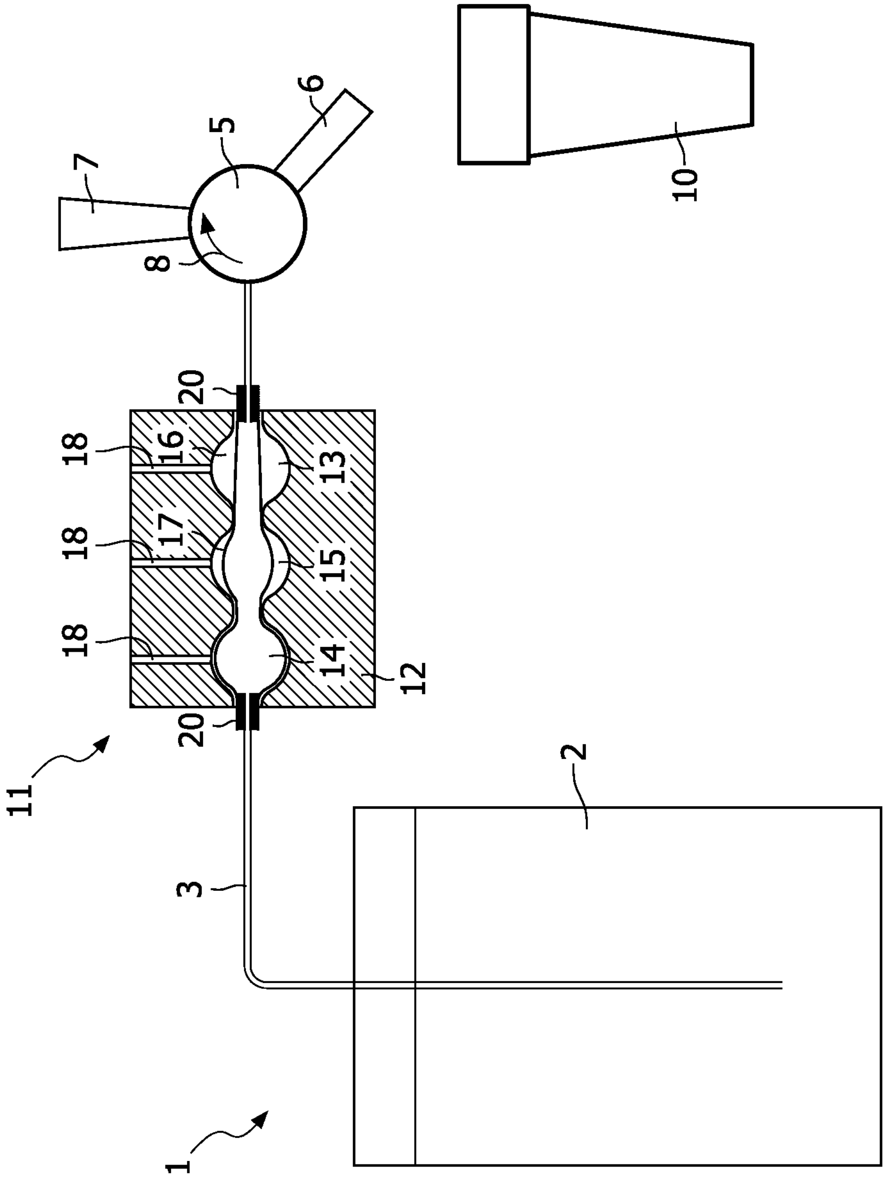
1
2
3
5
6
7
8
10
11
12
13
14
15
16
17
18
18
18
20
20

DOMESTIC BEVERAGE DISPENSING DEVICE HAVING COOLING MEANS AND METHOD OF USING SAME

FIELD OF THE INVENTION

The invention is related to a domestic beverage dispensing device comprising a compartment for enclosing a keg containing the beverage, and a tap for controlling the outflow of the beverage to be dispensed, and conduit means for supplying the beverage from the keg to said tap, and cooling means comprising a cooling member made of heat conductive material. The heat conductive material can be metal, preferably aluminum.

Although the invention is related to a beverage dispensing device, i.e. a device for dispensing any kind of beverage that has to be cooled down to a drinking temperature, hereinafter said device will also be referred to as beer dispensing device. However, other beverages can be treated in the same way.

BACKGROUND OF THE INVENTION

In a beer dispensing device for domestic use, the beer can be cooled while it is in the keg, before it is guided out of the keg to the beer dispensing tap of the device. Such a domestic beer dispensing device is disclosed in WO-A-2004/051163. In order to cool the beer contained in the keg, the keg can be placed in a refrigerator for some time before it is placed in the beer dispensing device. After it has been placed in the dispensing device, the keg can be kept cool in order to maintain its low temperature. For that purpose, the beer dispensing device can be provided with a cooling device having a relatively small capacity, for example a so called Peltier cooling device, being known in the art, which absorbs heat at one junction of paired metals or semiconductors and releases it at another junction thereof when electric current passes through these junctions.

Advantages of the Peltier cooling device are its limited dimensions and the fact that it can operate anywhere where electric power is available. However, such a cooling device has only a limited cooling capacity, so that it takes a relative long time when the beer in the keg has to be cooled down from the environmental temperature to the desired drinking temperature. Cooling down a keg containing 6 liters of beer from 23° C. to 3° C. may take more than 10 hours when it is cooled down by means of a Peltier cooling system in a domestic beer dispensing device. However, cooling down the beer in a much shorter time would require a relatively powerful cooling device, for example a compression cooling device, which in turn would require a large supply of electric current and a large volume for accommodating the cooling device, which are both disadvantages in the case a domestic beer dispensing device.

Another problem with a domestic beverage dispensing device is the hygiene of the apparatus. All parts of the device that contact the beverage during normal use have to be rinsed and/or cleaned from time to time, or have to be renewed from time to time. These parts can be supplied together with the keg, which is a disposable part.

SUMMARY OF THE INVENTION

An object of the invention is to provide a domestic beverage dispensing device for enclosing a keg containing a beverage, wherein the beverage to be dispensed can be cooled down from the environmental temperature to a drinking temperature without the need for a relatively large electric current supply to the beverage dispensing device.

Another object of the invention is to provide a beverage dispensing device for enclosing a keg containing a beverage, wherein the beverage to be dispensed can be cooled down from the environmental temperature to a drinking temperature in a relatively short period of time.

Another object of the invention is to provide a beverage dispensing device for enclosing a keg containing a beverage, wherein the beverage to be dispensed can be cooled down from the environmental temperature to a drinking temperature without the need for a large cooling device.

In order to accomplish one or more of these objects, the cooling member of the domestic beverage dispensing device has a passage surrounded by the heat conductive material of the cooling member, and a disposable tube of deformable material that extends through said passage forms at least a part of said conduit means for supplying the beverage from the keg to the tap, the outer diameter of said tube being smaller than the maximum inner diameter of the passage through said cooling member, and the deformability of the material of the disposable tube is such that the outer surface of the wall of the tube abuts essentially against the complete inner surface of said passage when the beverage is under a pressure of at least 0.5 bar above environmental pressure.

The beverage in the keg is pressurized in order to drive the beverage from the keg to the tap, and in the case of a carbonated beverage like beer, it has to be pressurized continuously. The pressure of the beverage can be between 0.5 bar and 1.5 bar above environmental pressure, or sometimes even higher. The deformable wall of the tube will be pushed against the inner wall of the cooling member during the dispensing of the beverage, the pressure of the beverage in the tube being for example 1 bar. The pushing force will provide for intensive heat conduction.

As the outer diameter of the tube is smaller than the inner diameter of the passage, the tube can be a disposable element that can be easily placed in the passage of the cooling member and easily removed from the cooling member. For example, the disposable tube can be delivered together with the keg and renewed when replacing the keg. In case the deformability of the tube is so high that the non-pressurized tube is not a round or cylindrical tube, the expression diameter refers to the transverse dimension of the tube at a low pressure inside the tube.

In beer dispensing devices for commercial use, for example for dispensing draft beer in taverns and the like, it is known to cool the beer in a chiller while it is guided from the keg to the beer dispensing tap. Such a method of cooling beer is efficient, because only the beer flowing to the tap is being cooled, and the beer flowing out of the tap can have always the predetermined temperature, because it is cooled just before being dispensed.

WO01/92145 discloses a domestic beverage dispensing device comprising a compartment for enclosing a keg containing the beverage, and a tap for controlling the outflow of the beverage to be dispensed, and conduit means for supplying the beverage from the keg to said tap, and cooling means comprising a cooling member made of heat conductive material, wherein the cooling member has a passage surrounded by said heat conductive material, whereby a disposable tube of deformable material forms at least a part of said conduit means and extends through said passage.

Preferably, the material of the disposable tube is plastic. The plastic material is deformable, and preferably also elastic, so that it returns to its original dimensions after the pressure in it drops to environmental pressure. As a result, the disposable tube can be easily removed from the passage of the cooling member in order to be renewed.

In a preferred embodiment, the inner diameter of the passage varies over its length, so that the surface of the inner wall is enlarged, resulting in an increased heat transfer between the wall and the beverage in the disposable tube. Preferably, the passage comprises at least one chamber, more preferably at least two chambers, having a larger inner diameter than other parts of the passage. A number of subsequent chambers provide a relatively large surface of the inner wall of the passage as well as some turbulence in the flow when the beverage flows through the passage.

In a preferred embodiment, the contents of the passage through the cooling member is at least 200 ml, so that a dispensing portion of the beverage can stay in the passage of the cooling member for some time before being dispensed. In addition, the heating capacity of the heat conductive material is sufficient to cool down a dispensing portion of the beverage in a relatively short time. Furthermore, it may be acceptable in the case of a domestic beverage dispenser that it takes a short time to cool the next portion of the beverage to be dispensed.

In a preferred embodiment, the cooling member has air conduits between said passage and the environment. The presence of such air conduits can avoid air inclusions between the deformable wall of the tube and the wall of the passage when the beverage in the tube is pressurized, which air inclusions would reduce the heat transfer in the cooling member.

The invention is also related to a disposable tube having a deformable wall for use in a domestic beverage dispensing device as described above.

The invention is furthermore related to a method of cooling a beverage in a domestic beverage dispensing device comprising a compartment for enclosing a keg containing the beverage, the beverage flowing through a tube to a tap for controlling the outflow of the beverage being dispensed, and wherein the tube is a disposable tube having a deformable wall, which tube is inserted in a passage through a heat conductive cooling member, and the beverage in the tube is subjected to a pressure, such that the deformable wall of the tube is pushed essentially against the complete inner wall of said passage.

BRIEF DESCRIPTION OF THE DRAWING

The invention will now be further elucidated by means of a description of an embodiment of a domestic beer dispensing device, comprising cooling means for cooling the beer, wherein reference is made to a schematic drawing of the device, in which components of the device are diagrammatically represented.

DETAILED DESCRIPTION OF AN EMBODIMENT

The beer dispensing device according to the described embodiment encloses a keg 1 containing beer 2. The means for pressurizing the beer and driving the beer out of the keg 1 through conduit 3 are not represented. The beer 2 can be contained in a flexible plastic bag, with the end of conduit 3 extending into the bag. The beer 2 can be driven out of the keg 1 by pumping air between the inner wall of the keg 1 and said flexible plastic bag. As an alternative, the keg 1 can be filled with beer 2, and nitrogen or $CO_2$ is pumped into the keg 1 above the beer 2 in order to drive the beer 2 out of the keg 1.

As described above, the beer 2 is pressurized by pumping means, so that the beer 2 can be guided through conduit 3 towards a dispensing tap 5 having an outlet 6. After the tap 5 has been opened by moving handle 7 in the direction indicated by arrow 8, the beer 2 can flow from the keg 1, through the conduit 3 to the tap 5, in order to leave the dispensing device through outlet 6. Through said outlet, a individual portion of the beer can flow into a drinking glass 10.

A cooling device 11 is present in order to cool the beer from the environmental temperature, i.e. the temperature in the keg 1, to a drinking temperature, which cooling device 11 comprises a cooling member 12 consisting of a piece of heat conductive material, represented in a sectional view. The cooling member 12 has a passage 13, which passage 13 comprises three chambers 14, 15, 16, having an increased inner diameter. The part 17 of the conduit 3, inside the passage 13, is made of deformable material. When the beverage in conduit 3 is pressurized, the deformable material of said part 17 is pushed against the inner wall of passage 13 of the cooling member 12. The part 17 then essentially abuts against the complete inner wall of the passage 13.

In the drawing, part 17 of conduit 3, which has a deformable wall, and which will hereinafter be referred to as deformable tube 17, is shown in three stages of pressurizing. In the right chamber 16, the deformable tube 17 is shown in its original stage, where no pressure is present inside it. The diameter of deformable tube 17 is smaller than the smallest inner diameter of passage 13 of cooling member 12. In the middle chamber 15, the deformable tube 17 is shown while the pressure inside it starts to increase, and in the left chamber 14 the deformable tube 17 is shown in its pressurized stage, where the wall of the tube 17 is pushed against the inner wall of passage 13. In order to avoid air inclusions between the deformable wall of the tube 17 and the inner wall of passage 13 during pressurizing, there are three air conduits 18 from the passage 13 to the outside of cooling member 12.

The deformable tube 17 is connected with the remaining part of conduit 3 by connection members 20, which members 20 are fixed to the deformable tube 17 and are clamped around the remaining part of conduit 3. The deformable tube 17, or the whole conduit 3, including deformable tube 17, is a disposable part of the beverage dispensing device; it can be renewed when a new keg 2 is placed in the device.

The cooling member 11 can be a cylindrical piece of heat conductive material, for example aluminum, but may have any other shape. It may comprise two parts being hingeabled with respect to each other, so that the deformable tube 17 can be easily placed in the passage 13. However, the transverse dimension of the deformable tube 17 is relatively small, so that it can be inserted in the passage 13 from one end of the passage 13.

The cooling device 11 may comprise a Peltier cooling system or another cooling system. The dimensions of the cooling member 12 are large enough to cool down an individual portion of the beverage, so that again and again an individual portion of a cool beverage can be dispensed after a short period of time, with the cooling member 12 being cooled continuously.

While the invention has been illustrated in the drawing and the foregoing description, such illustration and description are to be considered illustrative or exemplary and not restrictive; the invention is not limited to the disclosed embodiment. Any reference signs in the claims should not be construed as limiting the scope of the invention.

A domestic beverage dispensing device comprising conduit means 3 for supplying the beverage 2 from a keg 1 to a tap 5 and a cooling member 12. The cooling member 12 has a passage 13 surrounded by heat conductive material. A disposable tube 17 of deformable material forms at least a part of said conduit means 3 and extends through said passage 13. The deformability of the material of the disposable tube 17 is such that the outer surface of the wall of the tube 17 abuts against the inner surface of said passage 13 when the beverage is pressurized.

The invention claimed is:

1. A beverage dispensing device having a compartment including a beverage and a first beverage conduit, and a tap to dispense the beverage and including a second beverage conduit, the device comprising:

a cooling member including a chamber having a plurality of segments connected via a passage having two openings coupled to the first and second beverage conduits, the passage having a first non-expandable diameter, each respective segment of the plurality of segments having a respective second non-expandable diameter and a respective air conduit, and the second non-expandable diameter being larger than the first non-expandable diameter; and a tube configured to connect the two openings inside the passage and inside the plurality of segments for flow of the beverage in the tube, the tube having an expandable wall with a tube outer diameter and being expandable with pressure within the each respective segment to expand from the first non-expandable diameter to the second non-expandable diameter, wherein the tube outer diameter is between the first non-expandable diameter of the passage and the second non-expandable diameter of the each respective segment such that the tube loosely fits in the plurality of segments leaving a space in an original non-expanded state of the tube between the expandable wall of the tube and an inner wall of the plurality of segments for expansion of the tube to an expanded state when the beverage in the tube is pressurized, wherein the tube is configured to expand within the each respective segment to increase the tube outer diameter up to the second non-expandable diameter to abut against the inner wall of the plurality of segments when the beverage in the tube is pressurized for increasing heat transfer between the tube and the plurality of segments of the chamber of the cooling member such that a portion of the tube inside one of the plurality of segments has a larger diameter than a portion of the tube inside the passage between the plurality of segments.

2. The beverage dispensing device of claim 1, wherein the tube is plastic.

3. The beverage dispensing device of claim 1, wherein the passage further comprises a length, and wherein the first non-expandable diameter of the passage varies over the length of the passage.

4. The beverage dispensing device of claim 1, further comprising connectors configured to connect the tube to the first and second beverage conduits.

5. The beverage dispensing device of claim 1, wherein the passage comprises a volume of at least 200 ml.

6. The beverage dispensing device of claim 1, wherein the cooling member further comprises heat conductive material.

7. The beverage dispensing device of claim 1, wherein the tube is disposable.

8. The beverage dispensing device of claim 1, wherein the tube has an original shape prior to expansion when the beverage in the tube is pressurized, the tube returning to the original shape when the beverage in the tube is depressurized.

9. A method of cooling a beverage in a beverage dispensing device having a compartment including a beverage, and a first beverage conduit, a second beverage conduit, and a tap to dispense the beverage, the method comprising acts of:

providing a cooling member including an inlet coupled to the compartment via the first beverage conduit, an outlet coupled to the tap via the second beverage conduit, and a chamber having a plurality of segments between the inlet and the outlet, each respective segment of the plurality of segments having a respective diameter being larger than diameters of the inlet and the outlet;

providing a tube inside the plurality of segments for flow of the beverage in the tube, the tube having an expandable wall configured to expand with pressure within the each respective segment to a respective diameter of the each respective segment of the plurality of segments; and pressurizing the beverage for expanding the expandable wall within the each respective segment to increase the expandable wall within the each respective segment to the respective diameter of the each respective segment of the plurality of segments.

10. The method of claim 9, wherein the pressurizing act expands the tube such that the expandable wall of the tube is pushed against inner walls of the plurality of segments and heat transfer between the tube and the plurality of segments of the chamber of the cooling member is increased.

11. The beverage dispensing device of claim 1, wherein the respective air conduit is open to ambient and configured to avoid air inclusions between the tube and the passage and between the tube and the plurality of segments, the each respective air conduit being connected to the ambient to selectively add and remove air from the respective segment.

12. The beverage dispensing device of claim 1, wherein the tube is disposable and removable from the passage.

13. The beverage dispensing device of claim 1, wherein the cooling member includes first and second parts that are hingedly attached to each other.

14. The method of claim 9, wherein the act of providing a cooling member includes providing air conduits coupled to the each respective segment, and wherein the air conduits are open to ambient and configured to avoid air inclusions between the tube and the inlet and the outlet and between the tube and the plurality of segments, the air conduits being connected to the ambient to selectively add and remove air from the each respective segment.

15. The method of claim 9, wherein the tube is disposable and removable from the plurality of segments.

16. The method of claim 9, wherein the cooling member includes first and second parts that are hingedly attached to each other.

17. A beverage dispensing device having a compartment including a beverage, a first conduit, a second conduit, and a tap to dispense the beverage, the beverage dispensing device comprising:

a cooling member including an inlet coupled to the compartment via the first conduit, an outlet coupled to the tap via the second conduit, and a chamber having a plurality of segments between the inlet and the outlet, each respective segment of the plurality of segments having a respective diameter being larger than diameters of the inlet and the outlet; and a tube inside the plurality of segments for flow of the beverage in the tube, the tube having an expandable wall configured to expand with pressure within the each respective segment to a respective diameter of the each respective segment of the plurality of segments.

18. The beverage dispensing device of claim 17, wherein the tube has an outer diameter being between the diameters of the inlet and the outlet and the respective diameter of the each respective segment such that the tube loosely fits in the plurality of segments leaving a space between the expandable wall of the tube and an inner wall of the plurality of segments for expansion of the tube when the beverage in the tube is pressurized.

19. The beverage dispensing device of claim 18, wherein the tube is configured to expand within the each respective segment to increase the tube outer diameter of the tube up to the respective diameter of the each respective segment of the plurality of segments to abut against the inner wall of the plurality of segments when the beverage in the tube is pressurized for increasing heat transfer between the tube and the plurality of segments of the chamber of the cooling member such that a portion of the tube inside one of the plurality of segments has a larger diameter than a portion of the tube between the plurality of segments.

20. The beverage dispensing device of claim 17, wherein the inlet and the outlet and the each respective segment of the plurality of segments are non-expandable, and wherein the each respective segment of the plurality of segments has a respective air conduit open to ambient and configured to avoid air inclusions between the tube and the inlet and the outlet and between the tube and the plurality of segments, the respective air conduit being connected to the ambient to selectively add and remove air from the each respective segment.

* * * * *